April 28, 1970　　Z. W. WILCHINSKY ET AL　　3,509,336
APPARATUS AND METHOD FOR OBTAINING X-RAY DIFFRACTION PATTERNS
Filed March 7, 1969　　2 Sheets-Sheet 1
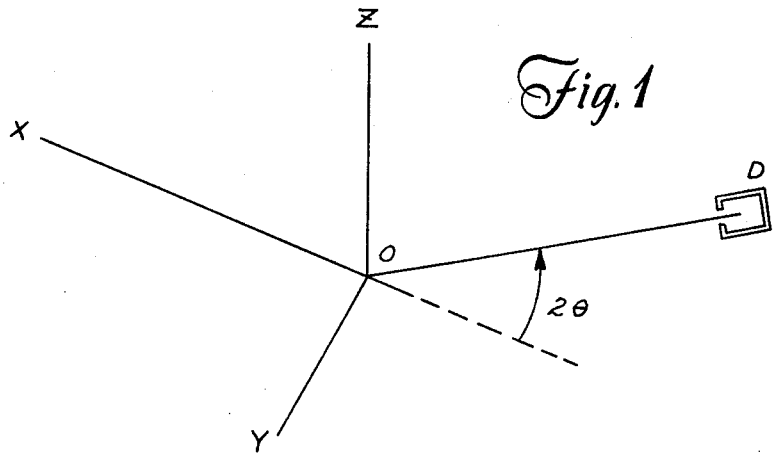
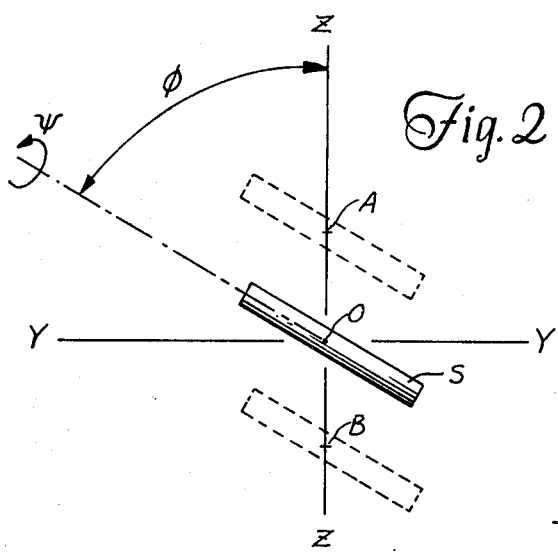
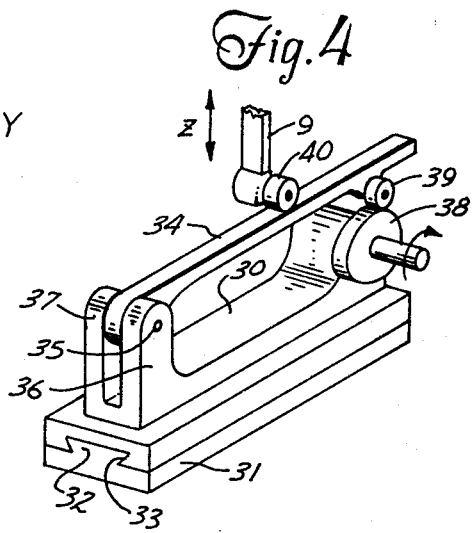
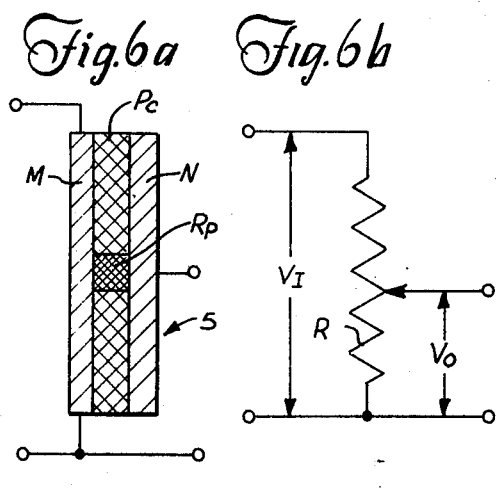
INVENTORS
ZIGMOND W. WILCHINSKY
THOMAS C. MENZEL
BY Donald F. Wohlers
ATTORNEY April 28, 1970   Z. W. WILCHINSKY ET AL   3,509,336
APPARATUS AND METHOD FOR OBTAINING X-RAY DIFFRACTION PATTERNS
Filed March 7, 1969                                   2 Sheets-Sheet 2
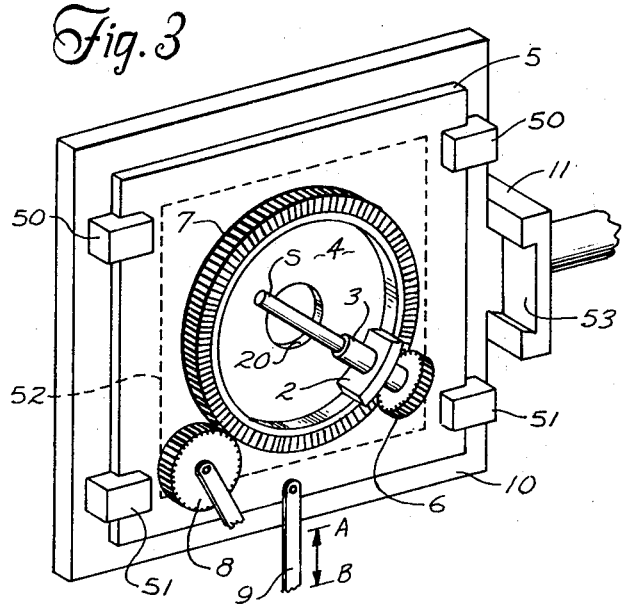
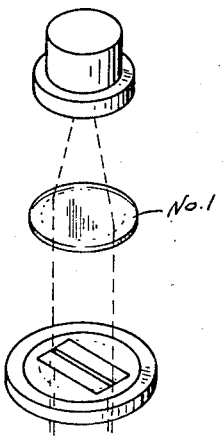
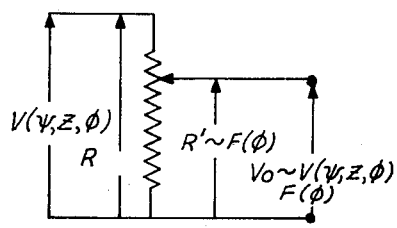
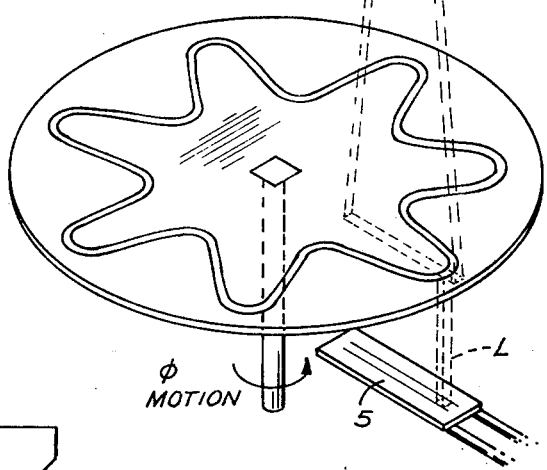
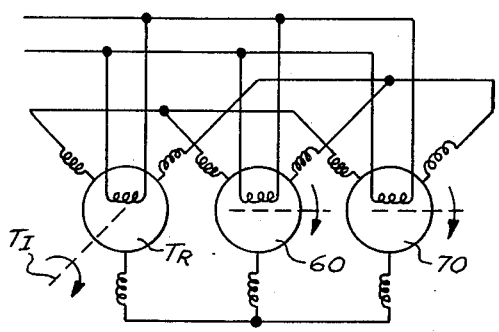
INVENTORS
ZIGMOND W. WILCHINSKY
THOMAS C. MENZEL
BY Donald F. Wohlers
ATTORNEY United States Patent Office 3,509,336
Patented Apr. 28, 1970

3,509,336
APPARATUS AND METHOD FOR OBTAINING X-RAY DIFFRACTION PATTERNS
Zigmond W. Wilchinsky, Westfield, and Thomas C. Menzel, Orange, N.J., assignors to Esso Research and Engineering Company, a corporation of Delaware
Continuation-in-part of application Ser. No. 521,926, Jan. 20, 1966. This application Mar. 7, 1969, Ser. No. 816,141
Int. Cl. G01n 3/20; H01j 37/20
U.S. Cl. 250—51.5                               11 Claims

ABSTRACT OF THE DISCLOSURE

The instant application is directed to a mechanism which provides means for holding an X-ray diffraction sample wherein the sample may be rotated in a plane perpendicular to the X-ray bombardment beam and at the same time rotated about an axis parallel to said plane. In addition, means are provided for imparting a reciprocal motion to the sample in a plane coincident with the plane of rotation of the sample perpendicular to the X-ray beam.

CROSS-REFERENCE TO RELATED APPLICATION

This application is a continuation-in-part of Ser. No. 521,926, filed Jan. 20, 1966, which is now abandoned.

BACKGROUND OF THE INVENTION

The present invention relates to apparatus and method for obtaining X-ray diffraction patterns of powders or polycrystalline solids, especially those having crystallites of preferred orientation. In general, it concerns an apparatus and a process or method which eliminate the distortions in the diffraction pattern of a material having crystallites of preferred orientation. In particular, it provides an accurate method for studying the structure and degree of crystallinity in the presence of orientation and for studying the effects on crystal structure, degree of crystallinity, etc., in various products, from processes that produce preferred orientation.

Accurate interpretations of X-ray diffraction patterns, such as "powder patterns" obtained by measurements of relative intensities, require that the patterns be those of samples in which the crystallites are randomly oriented. Distortions from normal X-ray diffraction powder patterns occur where there is preferred crystallite orientation in polycrystalline materials. Hence analyses which require quantitative intensity relationships in the diffraction pattern become very difficult or impossible unless the crystallite orientation is taken into account.

In samples where the crystallites are large in number and randomly oriented, there is no serious problem. In many instances, however, it is impossible or impractical to obtain samples in which the crystallites are randomly oriented. In such instances samples with some form of preferred orientation of the crystallites must be used.

The present invention is an improvement over the instruments described in U.S. patent applications Ser. No. 403,271, filed Oct. 12, 1964, and Ser. No. 501,755, filed Oct. 22, 1965. The prior instruments have made it possible for an experimenter to both obtain diffraction patterns that are free of preferred crystallite orientation effects and also to measure their degree of orientation.

As one example of the type of problem involved, if the diffraction pattern of isotactic polypropylene resin is compared to the diffraction patterns of polypropylene fiber having preferred orientation, it is readily seen that there are serious distortions in the patterns of the fibers with their preferred orientation. Such distortions preclude any meaningful measurement of the degree of crystallinity. There are, of course, many types of crystallites having preferred orientation. Crystalline polyolefins of the kind just mentioned are good examples of such materials, but the problem, and its solution according to the present invention, are not limited thereto. The device described herein is intrinsically more accurate than the prior devices mentioned above. Furthermore, its response is not changed when the X-ray wave length is changed. It can be used as a "pole figure" device. More specifically, with this device one can obtain the following:

(a) Diffraction patterns free of preferred orientation effects.
(b) The distribution of orientation for crystal planes.
(c) Diffractometer traces from which orientation parameters for specifying the degree of orientation can be determined.

Signals are obtained which can be interpreted by known detector means. In order to evaluate the X-ray diffraction patterns of materials in which preferred orientation exists, it is necessary to take such orientation into account. One possible method, in theory at least, for accomplishing this, is to measure the degree of orientation along with the associated intensity relationships, and to use this information to correct the diffraction pattern for the effects of preferred orientation. Such a procedure, although possible in principle, requires an exceedingly large amount of effort, and usually will be considered impractical.

According to the present invention, it is possible to effectively eliminate the distortions in the diffraction pattern due to preferred orientation of the crystallites, or where they are not eliminated, to know what they are and make due allowance, and thus overcome the problems mentioned above. This is accomplished by imparting both rotation and translation to the material being studied. The necessary equipment for accomplishing this may be referred to as a preferred orientation compensator.

The invention will be better understood by referring to specific aspects and embodiments which are illustrated in the accompanying drawings and described in detail below.

BRIEF DESCRIPTION OF THE DRAWINGS

In the drawings, FIGURE 1 is a diagrammatical three dimensional illustration of the X-ray diffraction principle applied to a crystalline material.

FIGURE 2 is a simplified representation of types of motion imparted to a sample.

FIGURE 3 is a front view of rotational movement and compensational equipment for imparting appropriate motion to a crystalline sample.

FIGURE 4 illustrates a mechanism for varying this amplitude of certain movements that can be imparted to samples mounted in the equipment of FIGURE 3.

FIGURE 5 is a schematic and expanded view of a photoelectronic generator.

FIGURE 6A is a view of a light controlled potentiometer element or "photopot."

FIGURE 6B is a graphical representation of a photopot equivalent circuit.

FIGURE 7 shows, somewhat diagrammatically, a $\phi$ motion synchro system.

FIGURE 8 is a simplified representation of the photopot operation.

DETAILED DESCRIPTION

In the process of the present invention, a sample of the material having crystallites of preferred orientation is prepared of suitable shape. This sample is placed into the sample holder of the preferred orientation compensator and is then positioned into the incident beam of an X-ray diffractometer, as indicated in FIGURE 1. This figure defines several of the important directions involved.

The positioning of the sample can most easily be described with a sample of cylindrical shape, although other geometries can also be used, as will subsequently be discussed. X-rays emerging from the source X are diffracted from the sample S located at O. The diffracted rays, making an angle 2θ with the incident beam, enter the slit of the detector D, which is of known type. In the system shown, the line OZ bisects the angle XOD. YO is perpendicular to XO, OD and OZ.

A cylindrical sample S is placed in the YOZ plane, FIGURE 2. The axis of the sample is coincident with the line ZO at first and it lies in the YOZ plane. With respect to this plane, the sample is subject to three simultaneous motions. First, it is spun about the cylinder axis. The angle of this rotation will be designed Ψ and this motion will be referred to as the Ψ motion. At the same time, the sample is rotated end over end in the YOZ plane, the angle between the sample axis and the Z direction being designated $\phi$. This motion is referred to as the $\phi$ motion. Simultaneously, with both of the two rotational motions just described, the sample is oscillated in the Z direction so that the center of the sample travels back and forth between positions A and B, which are equidistant from point O. At a fixed value of the diffraction angle 2θ (FIGURE 1), the diffracted intensity is a function of the sample position, i.e. a function of the coordinates Ψ, Z, and $\phi$. This intensity will be designated I(Ψ, Z, $\phi$) to imply this functional relationship. In terms of I(Ψ, Z, $\phi$), the application of the device to the problem can now be described more precisely.

Diffraction patterns free of the effects of preferred crystallite orientation are obtained by averaging I(Ψ, Z, $\phi$) over the three variables Ψ, Z, and $\phi$. This average intensity thus obtained will be designated $I_{av}$.

The distribution in orientation of a set of crystal planes is obtained by first maintaining the angle 2θ fixed at a value corresponding to the diffraction peak for these planes. For any position Ψ, Z, $\phi$ of the sample the diffracted intensity is then averaged over the Z coordinate, i.e. over the Z motion. The resulting intensity, designated I(Ψ, $\phi$) is proportional to the function giving the distribution of the orientation of the normals to the selected set of planes.

The apparatus of this invention can also be used to measure an average orientation with respect to a reference direction in the sample. In FIGURE 2, this reference direction is parallel to the cylinder axis. The orientation of a crystal plane can be specified by the angle, $\phi$, which the plane normal makes with respect to the reference direction. Another way of specifying the orientation is as some function $f(\phi)$ of the angle $\phi$. A "degree of orientation" may then be expressed as F($\phi$) averaged over all the crystal planes of the same family. This average can be expressed mathematically as follows:

$$\{f(\phi)I(\Psi, Z, \phi)\}_{av}=I_{av}<f(\phi)> \qquad (1)$$

where $<f(\phi)>$ is the normalized weighted average of $f(\phi)$. The explicit form of $f(\phi)$ may depend on the use the data will be put to. For example, an important case arises in which $f(\phi)=\cos^2 \phi$. The average $<\cos^2 \phi>$ obtained in accordance to Equation 1 is an important parameter in specifying the orientation in polymers and relating the orientation to the refractive index. For other cases, other forms of $f(\phi)$ may be required.

A brief description of the apparatus and its operation will be given next so that the function of the present invention can be clearly stated.

A sample holder for providing the $\phi$, Ψ, and Z motions described above is illustrated in FIGURE 3. Although this component was designed to fit a Norelco diffractometer, modifications to fit other diffractometers can be made easily. A shaft centers the holder on the axis of the goniometer of the diffractometer. A sample S is mounted in the sample chuck 3 which is mounted to rotate in a bushing or bracket 2 attached to the disk 4. This rotation is the Ψ motion. The center of disk 4 has a circular aperture 20 to allow passage of the diffracted X-rays. This disk is mounted in a plate 5, and means are provided for rotating the disk in its own plane; this is the $\phi$ rotation. As the disk 4 rotates, the sample chuck is caused to rotate by the engagement of a small bevel gear 6 with a ring gear 7 secured to disk 4. An independent drive gear 8 is provided to rotate the ring gear at a controlled speed. The Z motion is transmitted to the plate 5 by means of a reciprocably mounted bar 9 which is connected to a variable amplitude drive shown in FIGURE 4.

Referring to FIGURE 4, the variable amplitude drive comprises a supporting base 31 having on its top surface a keyway tongue element 32. A groove keyway element 33 in a slidable upper member 30 is fitted to the keyway tongue so that member 30 can be adjusted along the base 31 to any point desired. A lever 34 is pivoted to the upper member at 35 between a pair of upstanding arms 36 and 37 integrally formed with the base of frame element 30. A rotating cam 38 is journaled in the other end of the frame element 30 and cooperates with a roller cam follower 39 mounted near the other end of lever 34. The bar 9 rides through anti-friction roll 40 on a smooth flat upper surface of lever 34. Suitable drive means, not shown, are provided to drive the cam 38 in rotation as indicated by the arrow. By adjusting frame member 30 along the keyway 32 and 33, the amplitude of Z motion imparted to the plate 5 and all the parts carried thereby can be varied as desired.

A suitable drive motor, not shown, is provided for operating the independent drive pinion 8, FIGURE 3. The drive just described for the cam 38 reciprocates plate 5 at an essentially uniform linear speed between the extremes of its amplitude. See the arrow, FIGURE 3. Suitable guides 50 and 51 are provided for restraining plate 5 so that it can travel only along the Z direction. These guides are attached to a larger plate 10, whose center portion has been cut out, as indicated by the dashed lines 52, FIGURE 3. The sample is centered on the goniometer axis by means of a laterally sliding joint or keyway 53 in a support member 11, which permits the plate, 10 with a cooperating element mounted in keyway 53, to be moved in a direction perpendicular to its own plane. A second adjustment in the Z direction can be supplied by another similar arrangement, if desired, or by suitable adjustment of the zero position of the Z-motion drive mechanism of FIGURE 4.

In conjunction with the motion of the sample holder, a periodic function $$F(\phi)=f(\phi) \sin \phi \qquad (2)$$

is generated and is synchronized with the $\phi$ motion of the sample.

The function F($\phi$) can be generated in a number of ways. It is desired to obtain a signal representing the various values of this function.

One of the simplest forms of function of a function generator is a device that modulates the intensity of the incident or diffracted X-ray beam by means of a rotating absorption filter positioned in the incident or diffracted beam. The rotation of the filter is synchronized with the $\phi$ rotation of the sample. For example, by means of synchronous motors operating from a common switch or by a servomechanism, the latter being one of the many forms well known in the art. The transmittance of the filter is a function of $\phi$ proportional to F($\phi$). For example, in some applications it is required that F($\phi$) equals sine $\phi$. That when the angular position of the absorption filter is at some value of $\phi$, the transmittance of the filter has a value of sine $\phi$. Details of this method have been described in the earlier patent applications mentioned above. Although in principle the method is sound, its implementation usually involves an approximation of F($\phi$), and the experimental procedure is less convenient than the method of the present invention. Furthermore, the transmittance of the filter disk is also a function of the wavelength of the X-ray used. Therefore, if the wavelength is changed, a different absorbing filter disk must be used. Another possible method is one in which an electrical signal proportional to F(φ) is generated by the use of a commutator with large number of contacts. Each contact represents a discrete value of F(φ) which is held constant within a narrow range of φ values. With this method F(φ) is not a continuous function. Furthermore, contact potentials and transition voltages in moving from one contact to the next could be troublesome. A more elegant method is to use an electronic function generator. However, this method is too elaborate and too expensive for some purposes. The method preferred in the specific embodiment of this invention is a photo-electronic method which generates F(φ) as a continuous function. It is convenient to operate, and the required equipment can be manufactured at a moderate cost.

The basic scheme of the photo-electronic F(φ) generator is shown in FIGURE 5. F(φ) is first drawn double-size on white construction board with black ink. It is then photographically transferred to the function disk which consists of an 8-inch diameter, 0.060-inch thick, glass plate coated with a high contrast photographic emulsion. In this process, a negative of the drawing is produced on which small irregularities are diminished by the photographic reduction. A thin transparent line on an intense black background then represents F(φ) on the disk.

The light source, lens No. 1, the slits, and lens No. 2 form an intense image of the slit along a radius of the function disk. A small rectangle of light, L, FIGURE 5, formed by the intersection of the transparent line on the function disk and the slit image, passes through the disk and falls on the photopot 5. The photopot is, in essence, an electrical potentiometer. Its construction is shown in FIGURE 6A. Two strips of metal M and N are vacuum-deposited in parallel on a photoconductor. One strip M is thin and therefore has a high electrical resistance (analagous to the resistance wire employed in conventional potentiometers); the other, N, is extremely low in resistance. The rectangle of light is focused so that it bridges the gap between the resistor strip M and the high conductance strip N. Since the material PC between these strips is photoconductive, the portion covered by the rectangle of light $R_p$ has a very much lower electrical resistance than the non-illuminated portion. Electric current passes from one strip to the other through the illuminated region $R_p$ of the photoconductor. This rectangle of light is then analagous to the brush or contact wiper of a conventional potentiometer. Thus, a signal representing the function is produced.

FIGURE 6B shows the equivalent circuit of the photopot. The input voltage $V_I$ is the detector output voltage, which is proportional to the diffracted intensity I(Ψ, Z, φ). R denotes the resistance across which the input voltage is applied. In this equivalent circuit, it is assumed that the load resistance across which the output voltage $V_0$ appears is much greater than the resistance of the spot-illuminated photoconductor.

The function disk drive shaft may be linked directly by connecting drive means not shown with the shaft of the motor which produces the φ motion of the sample holder, so that the function disks' angular speed will be equal to the φ motion of the sample. To complete the synchronization of the two components, the zero position of the function generator should occur when the axis of the cylindrical sample is parallel with the Z direction of FIGURE 1.

The synchronization of the function disk with the sample holder φ motion is more readily carried out with the use of a direct torque and position transmission system shown in FIGURE 7.

Mechanical input torque $T_I$ is supplied by a variable speed motor, not shown, which drives the transmitter $T_R$; this in turn causes the receivers 60 and 70 to rotate at the same speed and in phase. An advantage of this system is that the F(φ) function generator can be remote from the sample holder.

As the function disk rotates, the rectangle of light transverses the photoconductor region of the photopot. This motion is directly propotrional to F(φ) and therefore the photopot brush motion is proportional to F(φ).

The desired product, $\{V(\Psi, Z, \phi)\}F(\phi)$, is achieved the voltage divider action of the photopot. (See FIGURE 8 which shows the equivalent circuit.) The output of the detector, V(Ψ,Zφ) is applied across the photopot input resistance R. The photopot output voltage, $V_0'$, appears across a part of the input resistance R', which depends on the brush position. The output voltage may then be written as $$V_0' = (R'/R)V(\Psi, Z, \phi) \quad (3)$$

where R' is proportional to F(φ), and V(Ψ, Z, φ) is proportional to I(Ψ, Z, φ). Hence Equation 1 can be rewritten as $$V_0' = \frac{k_I k_F}{R}\{I(\Psi,Z,\phi)\}F(\phi) = K\{I(\Psi,Z,\phi)\}F(\phi) \quad (4)$$

where $k_I$ is the proportionality constant between V(Ψ, φ) and I(Ψ, Z, φ), $k_F$ is the proportionality constant between R' and F(φ), and K is a constant whose value is $K=(k_I k_F)/R$. The constant, K, introduces only a scaling factor into the data.

The various motions of the sample holder and function generator can be operated separately or in any desired combination as the needs require. The oscillating or reciprocating means for imparting translational motion may be separate or combined with a rotational drive or drives. The resulting intensity is recorded on a conventional continuous strip chart recorder. These intensities may be measured at discrete values of the Ψ, Z, and φ coordinates, or while the sample is moved at selected constant speeds through these motions. For carrying out measurements at discrete values of the coordinates, appropriate coordinate scales on the various components of the device are used. Averaging is short compared with the "time constant" of the recorder circuit. (The time constant is the time required for the recorder response to reach the fraction 0.632 of its ultimate value when an input of constant value is applied.) In most commercial X-ray diffractometers the time constant can be varied between 1 and 16 seconds. Averaging over the Z motion is carried out to avoid corrections for geometric factors introduced when the φ position of the sample is varied. This averaging can be carried out conveniently when a "line source" of X-rays is used. An incident X-ray beam can then be obtained whose cross section is rectangular and whose intensity is uniform over the cross section. For the present application, the long dimension (width) of the rectangle is parallel to the OY direction in FIGURE 1. To carry out this averaging properly, the total excursion (twice the amplitude) of the Z motion should be equal to the diameter of the aperture in disk 4 of FIGURE 3. In cases where the sample is in the form of a uniaxially oriented sheet or its equivalent, a slit can be used if desired to limit the width of the X-ray beam. For this case, the amplitude of the Z motion is not critical. In addition to the above considerations, when averaging is carried out over two or more of the variables Ψ, Z, and φ, it is desirable that the ratios of the periods of their motions should be irrational numbers.

In terms of the above operational variables, the operation of our device can now be adequately described.

(A) *Orientation distribution.*—For this application, the function generator is not used, since the desired result is the intensity distribution, (Ψ, φ). The detector is held fixed at a value 2θ, the diffraction angle for a selected set of crystal planes. For a cylindrical sample, the cylinder axis is held at a series of discrete values of the angle φ, while the sample is rotated slowly in the Ψ direction and oscillated relatively rapidly through the Z motion. Compared with the time constant of the recorder circuit, the period of the Ψ rotation should be long, whereas the period of the Z oscillation should be short. The resulting intensity on the strip chart will be $I(\Psi, \phi)$ at a constant $\phi$. If desired, the sample can be rotated slowly through the $\phi$ and $\Psi$ motions simultaneously to obtain $I(\Psi, \phi)$. For a sample possessing an uniaxial orientation distribution, the $\Psi$ rotation is not necessary. In this case, the sample is rotated slowly through the $\phi$ motion to give the intensity distribution $I(\phi)$, the position $\phi=0$ occurring when the symmetry axis is parallel to the Z direction of FIGURE 1.

(B) *Elimination of preferred orientation effects.*—In this operation, the function generator, generating the function $F(\phi) = \sin \phi$, is synchronized with the $\phi$ motion of the sample. The intensity $I(\Psi, Z, \phi)$ is then multiplied by $\sin \phi$ in the manner already described, and the resulting intensity is averaged over the $\Psi$, Z and $\phi$ motions. Mathematically, this operation can be expressed by the following iterated integral:

$$I_{av} = C \int_0^\pi \left[ \int_A^B \left\{ \int_0^{2\pi} I(\Psi, Z, \phi) \sin \phi \, d\Psi \right\} dZ \right] d\phi$$
$$= \frac{C}{K} \int_0^\pi \left[ \int_A^B \left\{ \int_0^{2\pi} V_o' d\Psi \right\} dZ \right] d\phi \quad (5)$$

where $C =$ $$[1/\{2_\pi^2(B-A)\}]$$

A and B are the limits of the Z motion, as mentioned above, and the quantities $V_0'$ and K are the same as in Equation 4. It can be shown that the intensity $I_R$ for a similar sample with random orientation of the crystallites is related to $I_{av}$ by the equation:

$$I_{av} = \frac{2}{\pi} I_R \quad (6)$$

Therefore, at any diffraction angle, $2\theta$, the time averaged intensity obtained with our device is proportional to the intensity for a sample with random orientation.

During this operation, the diffraction pattern may be scanned over the desired range of diffraction angles, $2\theta$. In the resulting pattern, the relative intensities are the same as for a sample in which the crystallite orientation is random. If the sample possesses a uniaxial distribution of orientation, the $\Psi$ rotation is not necessary. Hence, the rotational drives may be separate or may be tied together in releasable manner to operate one or more from a single motor.

(C) *Determination of orientation parameters.*—The operational procedure is similar to that of the preceding case, except that the function generated by the function generator is $F(\phi) = f(\phi) \sin \phi$. Mathematically, the result is expressed as follows:

$$I_{av} <f(\phi)> = C \int_0^\pi \left[ \int_A^B \left\{ \int_0^{2\pi} I(\Psi, Z, \phi) F(\phi) d\Psi \right\} dZ \right] d\phi$$
$$= \frac{C}{K} \int_0^\pi \left[ \int_A^B \left\{ \int_0^2 V'_o d\Psi \right\} dZ \right] d\phi \quad (7)$$

One then obtains the desired quantity $<f(\phi)>$ by dividing Equation 7 by Equation 5. The quantity $<f(\phi)>$ can be used to characterize the orientation of crystalline as well as polymeric amorphous material by the methods described in the copending applications mentioned above.

It will be obvious that the particular mechanism illustrated and described above is only exemplary and that its various components may be varied and otherwise arranged to carry out the spirit and purpose of the invention. It is to be understood that the following claims are intended to cover the invention, including such modifications and alterations as would occur to those skilled in the art, as broadly as the prior art properly permits.

What is claimed is:
1. An apparatus for aid in incident beam X-ray diffraction analysis of a sample of crystalline materials which possess preferred orientation characteristics, which apparatus comprises in combination, first means for rotating said sample in a plane remaining perpendicular to said incident X-ray beam, said means producing an angular rotation $\phi$, second means for imparting a second rotation to said sample, said second rotation being around an axis which lies in said perpendicular plane, said axis extending through said sample and rotating end over end in said plane, third means for imparting reciprocal motion to said sample in a plane coincident with the plane of rotation of said sample and perpendicular to said X-ray beam, diffraction intensity signal generating detector means for detecting the diffracted X-ray beam and means for modifying the signal obtained at each position of said sample by a predetermined ratio.

2. Apparatus according to claim 1 which includes a holder for rotating a sample about its own axis, a rotatable plate capable of rotation in its own plane and supporting said holder, and means for reciprocating said plate in its own plane.

3. Apparatus according to claim 2 wherein the reciprocating means includes an adjustable drive element for varying the amplitude of said reciprocal motion.

4. Apparatus according to claim 1 which includes a rotary sample holder, a planar rotary base for supporting said holder, means for driving said base in rotary motion in its own plane, and gear means for driving the sample holder in rotary motion from the rotary motion of the base.

5. Apparatus according to claim 4 wherein the base is also mounted for translational movement and drive means are provided for imparting reciprocating translational motion thereto.

6. Apparatus according to claim 5 wherein the drive means for reciprocating translational movement are connected to a rotary drive means.

7. Apparatus according to claim 5 in which means are provided for synchronizing the two rotary motions with each other.

8. Apparatus according to claim 7 wherein the speeds of the two rotary motions can be varied so that the intensity diffracted from the sample can be measured as a function of the coordinates of the said rotary motions.

9. Apparatus according to claim 1 wherein said modifying means includes a function generator capable of producing a signal proportional to sine of $\phi$, means for synchronizing the function generator with said $\phi$ rotation of the sample, means for producing an electrical signal proportional to the multiplication product of the signal from said detector representing the diffracted intensity and the signal produced by the function generator, and means for detecting the multiplication product of the two signals.

10. Apparatus according to claim 9 in which the function generator contains an optical system producing a moving spot of light, and a photoconductive element on which the spot of light falls such that the position of the light spot determines, in a predictable manner, the electrical resistance of the photoconductive element.

11. Apparatus according to claim 9 which includes lens and slit means for passing a slender rectangular column of X-rays through the sample, and an optical system in the function generator which includes a slender rectangular column of light incident on a rotating element on which a selected function is represented as a transparent line on an opaque plate.

References Cited

UNITED STATES PATENTS

| | | | |
|---|---|---|---|
| 2,713,125 | 7/1955 | Geisler et al. | 250—51.5 |
| 2,761,068 | 8/1956 | Geisler et al. | 250—51.5 |
| 2,989,642 | 6/1961 | Svec | 250—216 |

RALPH G. NILSON, Primary Examiner

A. L. BIRCH, Assistant Examiner

U.S. Cl. X.R.

250—216